United States Patent [19]

Ivanov et al.

[11] Patent Number: 5,316,735

[45] Date of Patent: May 31, 1994

[54] APPARATUS FOR PRODUCING GRANULATED PRODUCTS

[76] Inventors: Oleg R. Ivanov, Rizhsky proezd, 5, kv. 57; Mikhail I. Snegirev, 1 Perevedenovsky pereulok, 12, kv. 84; Makhail K. Chistyakov, Verkhoyanskaya ulitsa, 6, korpus 1, kv. 302, all of Russian Federation, Moscow; Vladimir M. Razhev, 1 mikroraion, 26, kv. 25; Vládimir I. Budantsev, 1 mikroraion, 24, kv. 35, both of Russian Federation, Uvarovo; Jury I. Kipriyanov, Slavyansky bulvar, 7, korpus 1, kv. 90, Russian Federation, Moscow; Viktor A. Zaitsev, deceased, late of Russian Federation, Moscow; by Galina M. Zaitseva, administrator; by Natalya V. Zaitseva, administrator, both of Dmitrovskoe shosse, 37, korpus 1, kv. 172, Russian Federation, Moscow

[21] Appl. No.: 927,381

[22] PCT Filed: Dec. 12, 1990

[86] PCT No.: PCT/SU91/00273

§ 371 Date: Sep. 23, 1992

§ 102(e) Date: Sep. 23, 1992

[87] PCT Pub. No.: WO92/10283

PCT Pub. Date: Jun. 25, 1992

[51] Int. Cl.$^5$ .......................... B01J 8/18; F27B 15/00
[52] U.S. Cl. ................................ 422/143; 34/582; 34/594; 110/215; 122/4 D; 422/147; 422/311; 431/7; 431/170; 432/58; 239/428; 239/423; 239/416.4; 239/416.5

[58] Field of Search ............. 422/143, 147, 311; 34/57 A; 122/4 D; 110/245; 431/7, 170; 432/58; 239/428, 423, 416.4, 416.5, 9, DIG. 23, 553.3, 124, 472, 475, 399, 400

[56] References Cited

U.S. PATENT DOCUMENTS 3,735,792  5/1973  Asizawa et al. ................ 159/4 CC
4,602,571  7/1986  Chadshay ....................... 239/400 X

FOREIGN PATENT DOCUMENTS 201233  10/1967
631192  11/1978
1411018  7/1988

OTHER PUBLICATIONS

G. L. Groshev, et al. "Certain Design Features of Apparatuses with Pseudo-Fluidised Layer for Solutions Dehydration", p. 57, lines 19-34, p. 58, Figs. 4, 5. Khimicheskaya Promyshlennost, No. 6, 1967, Khimia (Moskow).

Primary Examiner—Robert J. Warden
Assistant Examiner—Krisanne M. Thornton
Attorney, Agent, or Firm—Ladas & Parry

[57] ABSTRACT

In a vertical cylindrical casing (1) of the apparatus along the axis thereof a gas-supplying pipe (8) is disposed, the end face (11) of which is disposed above a gas-distributing grating (3) at the level of the height of a fluidized bed formed thereon and in which a tube (12) is arranged with a swirler (13) inserted thereinto, said tube forming an annular gap (14) with the pipe (8). On the gas-supplying pipe (8) and on the gas-distributing grating (3) truncated cones (15, 16) are arranged coaxially, the upper end face (17) of the external cone (16) being disposed below the end face (11) of the gas-supplying pipe (8). In the upper part of the casing (1) in front of the inlet to an axial gas-discharging pipe (7) a baffle cone (19) is mounted.

8 Claims, 2 Drawing Sheets

APPARATUS FOR PRODUCING GRANULATED PRODUCTS

TECHNICAL FIELD

The present invention relates to equipment used in the chemical industry and more particularly to apparatus for producing granulated products by spraying a pulp or by melting a disperse material onto a suspended layer.

STATE OF THE ART

In the present state of the art apparatus are extensively used, in which the entire technological process of producing granulated products is carried out in a fluidized bed (U.S. Pat. No. 3,735,792). Such apparatus comprise a vertical cylindrical casing, a gas-supplying pipe arranged in the upper part thereof, a gas-distributing grating, a nozzle for spraying a pulp or a melt, disposed along the axis of the casing above a fluidized bed, a pipe for supplying a gas under the grating, a gas-discharging pipe coupled to the upper part of the casing, a pipe for supplying a disperse material, and pipe for discharging granules.

However, such fluidized-bed apparatus are disadvantageous because of the necessity of using disperse materials within a limited range of fractional composition. The concentration of particles in the central zone of the apparatus, in which spraying of a pulp or of a melt is effected by means of a nozzle, is small due to separation of the particles from a central stream into the opposite peripheral one; as a result, the efficiency of the apparatus lowers. Another disadvantage of the apparatus is a low relative velocity of gas in the fluidized bed, which also leads to a low efficiency of the apparatus because of a limitation to the amount of heat fed (removed) to the material in the fluidized bed.

Also known in the art is an apparatus for producing granulated products (Paper by Groshev G. L. et al "Nekotorye konstruktivnye osobennosti apparatov s psevdoozhizhennym sloyem dlya obezvozhivania rastvorov," Khimicheskaya promyshlennost, N 6, 1967, p. 58, FIGS. 4 and 5), comprising a vertical cylindrical casing, a gas-distributing grating, a vertical gas-supplying pipe fastened therein and provided with a nozzle for spraying a pulp or a melt, disposed thereinside, a pipe for supplying a gas under the grating, an axial gas-discharging pipe coupled to the upper part of the casing, a pipe for supplying a disperse material, a pipe for discharging granules from a fluidized bed, and a device for isolating the granules from effluent gases.

In the known apparatus the vertical gas-supplying pipe fastened in the grating allows an increase in apparatus efficiency, compared to other fluidized-bed apparatus, due to the supply of a gas to the fluidized bed with high velocities (10–20 m/s), whereby local gushing zones are created. Nevertheless, the efficiency of such an apparatus is limited, since the size of the vertical gas-supplying pipe and the velocity of the gas introduced therethrough are limited. An increase of the size of the vertical gas-supplying pipe or of the velocity of the gas introduced therethrough leads to the entrainment of the particles from the fluidized bed, to the diminution of granule-formation centers, to disturbance of the operability of the apparatus, and to lowering of the efficiency thereof. As a result, the main disadvantage of such an apparatus is its low efficiency.

DISCLOSURE OF THE INVENTION

The invention is based on the problem of providing such an apparatus for producing granulated products, the constructional design of which would make it possible to intensify the granulation process by way of increasing velocity of gas supplied into the fluidized bed, which would raise the efficiency of the apparatus and reduce the time of residence of the granules in the apparatus ensuring improvement of quality of the resulting product.

The object set forth is accomplished by an apparatus for producing granulated products, comprising a vertical cylindrical casing with a gas-distributing grating in the lower part thereof, a vertical gas-supplying pipe mounted in the gas-distributing grating for creating a fluidized bed of granules thereon, a pipe for supplying disperse materials, a nozzle for spraying a pulp or a melt, disposed inside the vertical gas-supplying pipe, an axial gas-discharging pipe disposed in the upper part of the casing, a device for isolating the granules from the effluent gases, a pipe for discharging the granules from the fluidized bed, a pipe for supplying gas under the gas-distributing grating, according to the invention, the vertical gas-supplying pipe is arranged along the axis of the casing and its upper end face is disposed above the gas-distributing grating on the level of the height of the fluidized bed being formed, the gas-distributing grating is provided with coaxially disposed truncated cones, of which the internal one is secured on the end face of the vertical gas-supplying pipe and the external one is secured on the gas-distributing grating so that its end face is disposed lower than the end face of the vertical gas-supplying pipe, whereinside a tube is disposed, provided with a swirler built thereinto and constituting an annular gap with said pipe, a baffle cone being installed in the upper part of the casing in front of the entrance into the axial gas-discharging pipe.

It is expedient that the device for isolating the granules from the effluent gases should be made as a cyclone, having its outlet pipe communicated with the cylindrical casing above the end face of the vertical gas-supplying pipe, and be provided with a means for discharging the granules from the cyclone. It is desirable that the outlet pipe of the cyclone should be coupled to the cylindrical casing tangentially.

In accordance with another embodiment of the device for isolating the granules from the effluent gases, this device is made in the form of an additional gas-supplying pipe, tangentially connected with the upper part of the casing, and a conical funnel mounted on the axial gas-discharging pipe on the end face of the inlet thereof and having a cylindrical shell at the end. An additional pipe for supplying disperse material may be mounted into the additional gas-supplying pipe above the lower edge thereof.

The lower end face of the cylindrical shell may be disposed at the level of the end face of the baffle cone or below the end face thereof; it is expedient that the lower end face of the gas-discharging pipe should be arranged on the level of the lower edge of the additional gas-supplying pipe.

Such a design of the apparatus provides an appreciable increase of the apparatus efficiency as well as an essential improvement in the quality of the resulting product. Thus, the arrangement of the vertical gas-supplying pipe along the axis of the casing of the apparatus and the disposition of the upper end face of said pipe above the gas-distributing grating at the level of the height of the fluidized bed makes it possible, by way of ejection of the particles from the fluidized bed by the stream of gas supplied through the vertical gas-supplying pipe, to increase the concentration of the particles in the volume of the apparatus above the fluidized bed and to create a dense annular curtain from the disperse material which is moving upwards. Due to an increase of the amount and the rate of flow (for example, to 25-50 m/s) of the gas introduced through the vertical gas-supplying pipe, an increase is provided in the amount of heat supplied to (in the case of pulp spraying) or removed from (in the case of melt spraying) the disperse material in the annular curtain, this leading to a higher efficiency of the apparatus.

When the distance from the grating to the end face of the vertical gas-supplying pipe is increased to exceed the height of the fluidized bed, the amount of the particles entrained from the fluidized bed diminishes, and this leads to the pulp or melt being sprayed not onto the curtain of disperse material but onto the wall of the cylindrical casing, to a disturbance of the apparatus operability, and to a reduction of its efficiency, since the quantity of the particles moving upwards and being granulation centres diminishes.

When the distance to the vertical gas-supplying pipe is reduced to be less than the height of the fluidized bed, the amount of the particles coming into the annular curtain increases (because the height of the fluidized bed is set to be at the level of entrainment of the particles) and this leads to overfilling of the apparatus volume with the disperse material and to the disperse material getting into the vertical gas-supplying pipe, because the kinematic energy of the stream is not sufficient for the ascension of the entire mass of the disperse material. This brings about a reduction of the apparatus efficiency because of necessity in cleaning the vertical gas-supplying apparatus.

The arrangement of two truncated cones one above the other with a gap therebetween above the grating makes it possible to introduce through openings in the grating a gas into said gap, which gas blows off the particles from the lower cone into the ascending annular curtain consisting of the disperse material. Therefore, no accretions from the material are formed on the walls of the vertical gas-supplying pipe as the gas temperature therein increases, the process of granulation being thus intensified. Furthermore, as a result of the disposition of the end face of the upper cone on the end face of the vertical gas-supplying pipe, the quantity of the particles blown out from the fluidized bed into the annular curtain of the disperse material increases and this leads to an increase of the granulation centers and of the apparatus efficiency.

The arrangement inside the vertical gas-supplying pipe of a tube with a swirler built into it, making an annular gap with said pipe, ensures swirling of the central stream, which leads to separation of the particles from the central stream into the peripheral one and allows the rate of flow in the vertical gas-supplying pipe to be increased without an increase of the entrainment of the particles from the volume of the apparatus.

The arrangement of the baffle cone in the upper part of the casing in front of the entrance to the axial gas-discharging pipe makes it possible, through deviation of the central stream to the periphery and owing to the rebounding of the granules after their impact with the surface of the baffle cone, to separate the granules into the fluidized bed, this leading to an increase of the granulation centers and of the apparatus efficiency.

Mounting of the cyclone for the isolation of the granules from the effluent gases, whose outlet pipe is communicated with the cylindrical casing, makes it possible to return the granules to the fluidized bed; in this case large granules settle on the gas-distributing grating and are withdrawn from the apparatus, whereas the small ones are blown out from the fluidized bed into the annular curtain, which leads to an increase of the apparatus efficiency and to an improvement in the quality of the product due to a reduction of the content therein of both small granules and large granules having a size exceeding the prescribed one.

An increase of the intensity of the granulation process and of the apparatus efficiency leads to a reduction of the residence time of the product in the apparatus and to an improvement of the quality of the granules due to a shorter period of their residence in the zone of high velocities and temperatures (during drying and granulation).

The arrangement of the pipe for supplying disperse material in the upper part of the casing above the lower edge of the tangential gas-supplying pipe leads to a uniform distribution of the disperse material over the wall of the casing by the stream of gas introduced through the tangential gas-supplying pipe and to a uniform feed of the disperse material onto the gas-distributing grating, which precludes deposition of the material on the grating and results in an increase of the apparatus efficiency.

The additional gas-supplying pipe is arranged tangentially in the upper part of the casing and ensures, as the gas is supplied therethrough, the creation of a peripheral swirled stream. The conical funnel deflects said stream towards the wall of the casing and this deflected stream through the gap between the cylindrical shell and the casing of the apparatus is directed downwards along a helical line. The inner baffle cone deflects the central stream of gas to the periphery, which contributes to the transmission of torque from the peripheral swirled stream to the central one and ensures separation of the disperse material from the central stream into the peripheral one. The peripheral gas stream returns the disperse material into the fluidized bed.

Thus, the additional gas-supplying pipe, the conical funnel, the cylindrical shell, and the inner cone shape gas streams in the apparatus, which ensure recirculation of the particles, an increase of the mass of the disperse material in the volume of the apparatus, and, as a consequence, an increase of the efficiency.

When the end faces of the cylindrical shell and of the inner cone are disposed on the same level, the transmission of the torque from the peripheral swirled stream to the central one occurs after the exit of the peripheral stream from the gap between the cylindrical shell and the casing and the energy of the peripheral gas stream is used most completely for the separation of the particles from the central stream into the peripheral one, whereby the quantity of the particles recirculating in the volume of the apparatus is increased and the efficiency of the apparatus is made higher.

The arrangement of the end face of the cylindrical shell below the end face of the inner cone brings about a reduction of the entrainment of the disperse material, introduced through the gap between the cylindrical shell and the casing of the apparatus, by the effluent gases. As a result, the concentration of the particles in the volume of the apparatus and the efficiency of the apparatus are increased.

When the pipe for supplying the disperse material is arranged inside the tangential gas-supplying pipe, the uniformity of the distribution of the particles over the wall of the casing increases, this contributing to the higher efficiency of the apparatus.

When the edge of the gas-discharging pipe is disposed level with the lower edge of the tangential gas-supplying pipe, the formation of the peripheral swirled stream occurs with smaller pressure losses by friction, which also leads to the higher efficiency of the apparatus.

BRIEF DESCRIPTION OF THE DRAWINGS

The invention will become more fully apparent from a subsequent detailed description of an exemplary embodiment thereof with reference to the accompanying drawings, in which.

BEST MODE TO CARRY OUT THE INVENTION

Figures 1, 2:
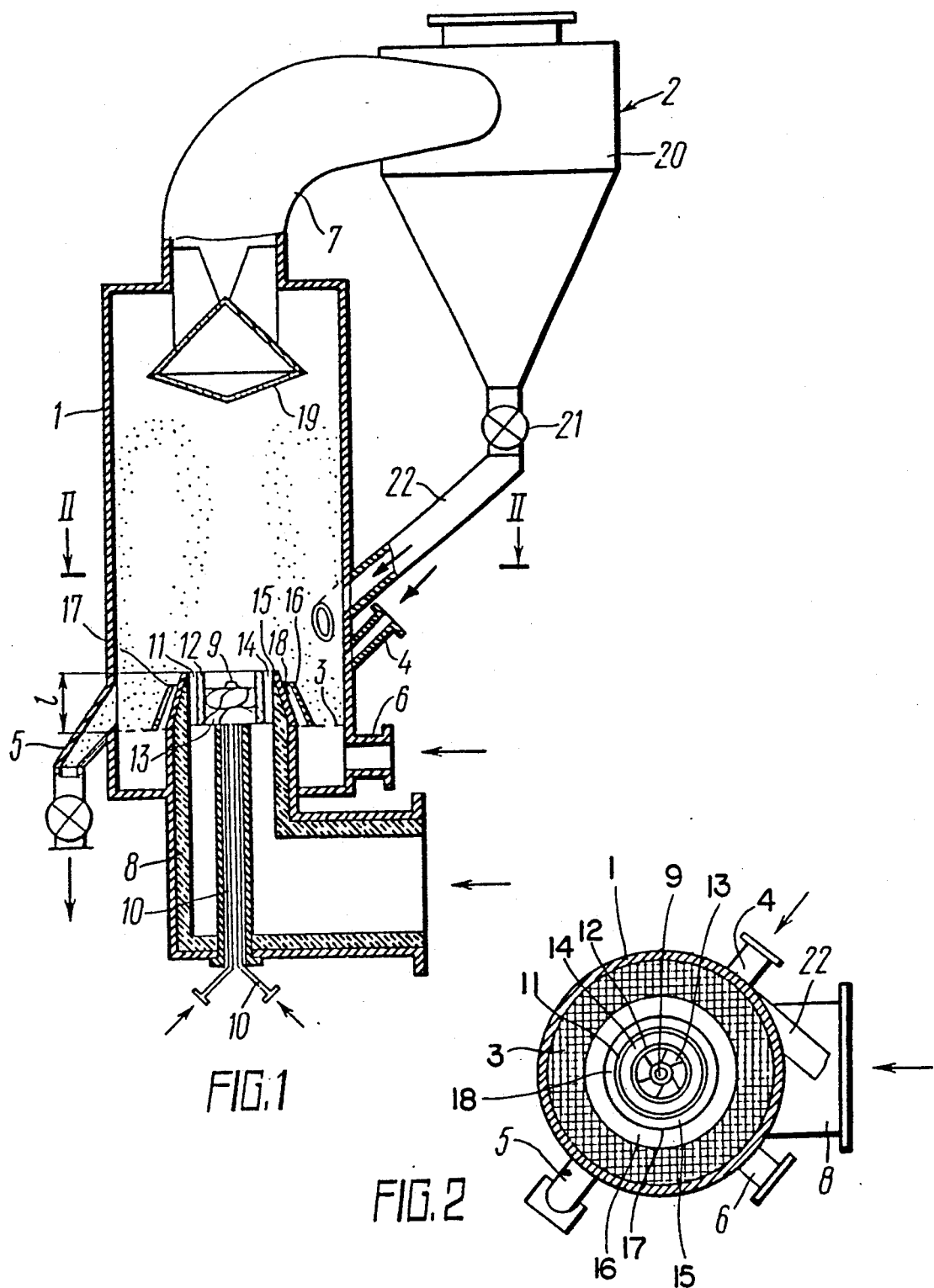
FIG. 1 is a general view of an apparatus for producing granulated products, a partial longitudinal section, according to the invention.
FIG. 2 is a section along II—II in FIG. 1.

The herein-proposed apparatus for producing granulated products comprises a cylindrical casing 1 (FIG. 1), whose upper part communicates with a device 2 for isolating granules from effluent gases, in the lower part of the casing 1 a gas-distributing grating 3 being disposed for creating a fluidized bed. The apparatus comprises also a pipe 4 for supplying a disperse material, a pipe 5 for discharging granules from the fluidized bed, a pipe 6 for supplying a gas under the gas-distributing grating 3, and an axial gas-discharging pipe 7, coupled to the upper part of the casing 1, a vertical gas-supplying pipe 8 arranged along the axis of the casing and secured in the grating 3.

The gas-supplying pipe 8 is provided with a nozzle 9 disposed thereinside for spraying a pulp or a melt supplied through pipes 10. The upper end face 11 of the gas-supplying pipe 8 is disposed above the gas-distributing grating 3 at the distance 1 equal to the height of the formed fluidized bed. Arranged inside the gas-supplying pipe 8 is a tube 12, whose upper end face is disposed level with the end face 11 of the gas-supplying pipe 8. A swirler 13 of a conventional design is built into the tube 12, and an annular gap 14 is provided between the tube 12 and the pipe.

The gas-distributing grating 3 is provided with coaxially arranged truncated cones 15 and 16, the inner cone 15 being secured on the upper end face 11 of the gas-supplying pipe 8 and the outer cone 16 being secured with its lower end face on the gas-distributing grating 3; the height of the cone 16 is smaller than that of the cone 15, so that the upper end face 17 of the cone is disposed below the upper end face 11 of the pipe 8. The cones 15, 16 are arranged in such a manner that an annular gap 18 formed therebetween narrows in a direction to the upper end faces of said cones.

A baffle cone 19 is mounted in the upper part of the casing 1, in front of the entrance to the axial gas-discharging pipe 7.

The device 2 for isolating granules from the effluent gases may have various designs. Thus, in accordance with FIG. 1 the device 2 is made as a conventional cyclone 20 equipped with a means 21 for discharging granules from the cyclone, for example, in the form of a gate-type feeder or of any other design. An outlet pipe 22 of the cyclone 20 is communicated with the cylindrical casing 1 above the upper end face 11 of the vertical gas-supplying pipe 8. This pipe 22 may be connected with the cylindrical casing tangentially, as shown in FIG. 2 (that is, tangentially to its circumference).

Figure 4:
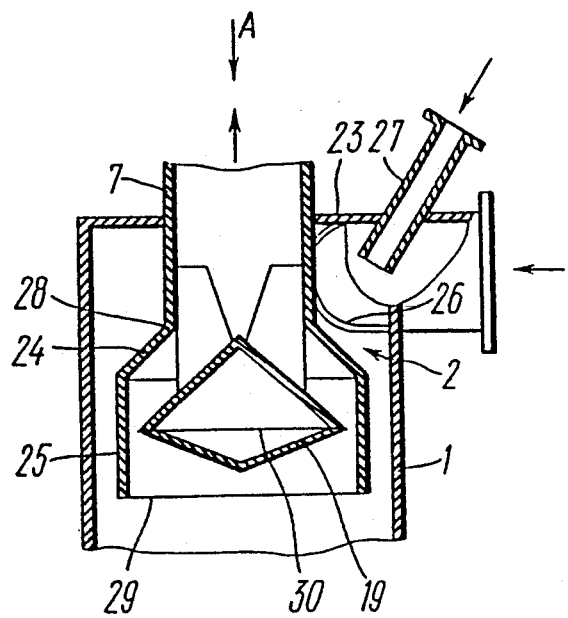
FIG. 4 is another embodiment of a device for isolating granules from effluent gases.
Figure 3:
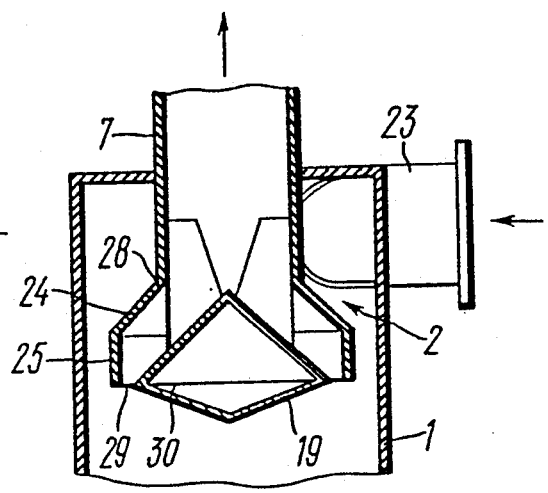
FIG. 3 is an embodiment of a device for isolating granules from effluent gases.
Figure 5:
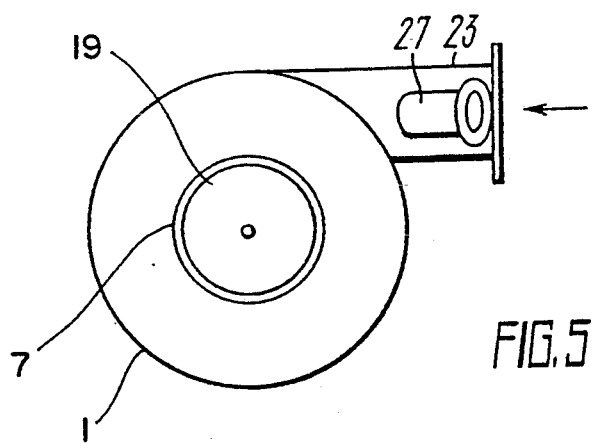
FIG. 5 is a view taken along arrow A in FIG. 4.

In accordance with FIGS. 3, 4 the device 2 is made in the form of an additional gas-supplying pipe 23, tangentially connected with the upper part of the vertical cylindrical casing 1 (FIG. 5), and a conical funnel 24 (FIGS. 3, 4) with a cylindrical shell 25 at the end thereof. The conical funnel 24 is mounted on the axial gas-discharging pipe 7 at the inlet thereof.

Into the additional gas-supplying pipe 23 above its lower edge 26 an additional pipe 27 is mounted for supplying a disperse material, the lower edge 26 of the gas-supplying pipe 23 being disposed level with an end face 28 of the inlet of the gas-discharging pipe 7.

The lower end-face 29 of the shell 25 is disposed level with the end face 30 of the baffle cone 19 (FIG. 3). The additional pipe 27 for supplying a disperse material is mounted in the pipe 23 so that the lower end face 29 of the shell 25 is disposed below the end face 30 of the baffle cone 19 (as shown in FIG. 4).

The herein-proposed apparatus operates in the following manner.

Into the cylindrical casing 1 (FIG. 1) through the pipe 4 granules are charged. A stream of gas introduced through the pipe 6 and openings in the grating creates a fluidized bed of the granules which are ejected from the fluidized bed by a stream of gas introduced through the gap 14 between the pipe 8 and the tube with the formation of an annular curtain of ascending granules above the fluidized bed.

A stream of gas introduced through the gap 18 between the cones 15 and 16 also blows the granules out of the fluidized bed into the annular curtain. Onto the granules in the annular curtain there is sprayed through the nozzle 9 a pulp (solution) as hot gas is supplied into the apparatus through the pipe 8 and drying and granulation is effected, or a melt is sprayed as cold gas is supplied and granulation is effected by cooling the melt. The gas stream introduced through the pipe 8 and the swirler 13 ensures uniformity of spraying of the pulp (or melt) introduced through the nozzle.

As the granules ascend in the annular gap, they are either heated (in the case of pulp spraying) or cooled (in the case of melt spraying) due to the transfer of heat from the central stream introduced through the gap 14 and the swirler 13. Fine granules are formed as a result of drying or cooling of fine drops of the solution or melt, formed as the solution or melt is sprayed through the nozzle 9. Granulation is effected by enlarging fine granules by coating them with a film of the pulp or melt and subsequent drying or crystallization thereof due to the transfer of heat from the granules and from the central stream of gas. The fine granules recirculate between the annular curtain and the fluidized bed, whereas large granules are withdrawn from the apparatus as a result of their precipitation onto the grating 3 in the fluidized bed, from which grating these granules are discharged through the pipe 5.

Isolation of the granules from the central gas stream is performed under the effect of the swirled gas stream introduced through the swirler 13 and of the baffle cone 19, which deflect the central stream to the periphery, which leads to the falling of the granules into the fluidized bed by gravity. The granules are separated from the effluent gas also due to their rebounding from the surface of the baffle cone 19 and in the cyclone 20, from which the granules are directed through the pipe 22 into the fluidized bed.

The supply of gas through the tangential gas-supplying pipe 23 (FIGS. 3, 4) creates a peripheral swirled stream which passes through the gap between the casing 1 and the cylindrical shell and contributes to the separation of the granules from the central stream into the peripheral one and to the recycling of the granules into the fluidized bed.

During the tests of the apparatus proposed herein it was established that if the distance from the gas-distributing grating to the end face of the vertical gas-supplying pipe is increased to exceed the height of the formed fluidized bed, which was attained by increasing the stream of the particles discharged from the apparatus, disturbance of the apparatus operability was observed in the experiment, because the temperature of the effluent gases increased to 140°-150° C. and accretions were formed on the walls of the apparatus, this leading to the necessity of cleaning the walls of the apparatus and to a reduction of the apparatus efficiency. If said distance was diminished to be less than the height of the fluidized bed, which was attained by decreasing the stream of the particles discharged from the apparatus, pulsation of the pressure of gas supplied into the vertical gas-supplying pipe was observed in the experiment, the material got into the pipe, and this led to the necessity of cleaning the pipe and to a reduction of the apparatus efficiency.

Thus, the proposed design of the apparatus made it possible through intensification of the technological process (drying or cooling) and directed movement of the gas streams to attain an essential increase in the apparatus efficiency, a reduction of heat losses into the environment, and to improve the quality of the resulting product respectively.

Thus, for example, in the production of monobasic ammonium phosphate the specific efficiency of the above-described apparatus in terms of the evaporated moisture is 340-370 kg/m$^3$ per hour, this being 5-6 times higher than the specific efficiency of the known fluidized-bed apparatus for the production of granulated products.

INDUSTRIAL APPLICABILITY

The present invention may find application in the chemical and metallurgical industry, in the production of building materials, in the foodstuffs industry, in the medical industry, and in other allied fields.

What is claimed is:

1. An apparatus for producing granulated products, comprising a substantially vertical cylindrical casing having a longitudinal axis, a lower part and an upper part, gas-distributing grating means comprising a horizontal grating situated in the lower part of the casing, first pipe means for supplying granules to said casing above said grating, first gas-supply pipe means below said grating for supplying gas to said grating to cause said granules to form a fluidized bed of a given height above the grating, second gas supply pipe means entering the lower part of the casing for supplying gas to cause granules from said fluidized bed to form an annular curtain of granules above the fluidized bed, nozzle means entering the lower part of the casing and disposed inside said second gas supply means for receiving and spraying a pulp or a melt onto granules in the annular curtain, an axially disposed gas-discharging pipe means disposed in the upper part of the casing for allowing the discharge of gas from the casing, said second gas supply pipe means being arranged along said axis of the casing and having an upper end face through which gas is supplied to the casing, said upper end face extending a distance above the grating, said gas-distributing grating means further comprising an internal truncated cone and an external truncated cone coaxially disposed to one another and defining an annular gap therebetween, said internal cone being secured around the upper end face of the second gas supply pipe means, said external cone being secured on the grating and having an upper end face extending above said grating a distance which is less than the distance the upper end face of the second gas supply pipe means extends above the grating, said nozzle means comprising swirler means below an upper end of said nozzle means for promoting uniformity of spraying of the pulp or melt sprayed through the nozzle means, said swirler means positioned internally of said second gas supply means and comprising a tube with a swirling element inside and wherein said tube defines an annular gap with said second gas supply pipe means, baffle cone means situated in the upper part of the casing in front of the axial gas-discharging pipe means for deflecting gas entraining granules, and separation means for separating granules from effluent gases.

2. An apparatus as claimed in claim 1, wherein the separation means comprises a cyclone having outlet pipe means communicating with the cylindrical casing for discharging granules into the cylindrical casing above the upper end face of the second gas supply pipe means.

3. An apparatus as claimed in claim 2, wherein the outlet pipe means is connected with the cylindrical casing tangentially.

4. An apparatus as claimed in claim 1, wherein the separation means comprises an additional gas-supplying pipe tangentially connected with the upper part of the cylindrical casing, and an inverted funnel mounted on the axial gas-discharging pipe means, said funnel having an end comprising a cylindrical shell.

5. An apparatus as claimed in claim 4, further comprising additional pipe means for supplying granules to the apparatus, said additional pipe means being mounted into the additional gas-supplying pipe.

6. An apparatus as claimed in claim 4, wherein said cylindrical shell and said baffle cone means each has a lower end face, the lower end face of the cylindrical shell being disposed on the same level as the lower end face of the baffle cone means.

7. An apparatus as claimed in claim 4, wherein said cylindrical shell and said baffle cone means each has a lower end face, the lower end face of the cylindrical shell being disposed below the lower end face of the baffle cone means.

8. An apparatus as claimed in claim 4, wherein said axial gas discharging pipe means has an inlet with an end face and said additional gas-supplying pipe has a lower edge, the end face of the inlet of the gas-discharging pipe means being disposed on the same level as the lower edge of the additional gas-supplying pipe.

* * * * *